(12) United States Patent
Kayanuma (10) Patent No.: US 10,379,511 B2
(45) Date of Patent: Aug. 13, 2019

(54) PROGRAM GENERATION DEVICE GENERATING PROGRAM FOR GROOVE MACHINING BY DRILLING

(71) Applicant: FANUC Corporation, Yamanashi (JP)

(72) Inventor: Tomokazu Kayanuma, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 72 days.

(21) Appl. No.: 15/423,784

(22) Filed: Feb. 3, 2017

(65) Prior Publication Data

US 2017/0235289 A1    Aug. 17, 2017

(30) Foreign Application Priority Data

Feb. 16, 2016 (JP) ................. 2016-026672

(51) Int. Cl.
G05B 19/042 (2006.01)
G05B 19/402 (2006.01)

(52) U.S. Cl.
CPC ....... G05B 19/0426 (2013.01); G05B 19/402 (2013.01); *G05B 2219/45129* (2013.01); *G05B 2219/49119* (2013.01); *G05B 2219/50036* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 5,495,430 A * | 2/1996 | Matsunari | ........ G05B 19/41865 700/100 |
| 5,870,306 A | 2/1999 | Harada | |
| 2010/0094450 A1 | 4/2010 | Zhao et al. | |
| 2010/0305745 A1 | 12/2010 | Iriguchi et al. | |
| 2015/0301516 A1 | 10/2015 | Ota | |

FOREIGN PATENT DOCUMENTS

| | | |
|---|---|---|
| DE | 19725101 A1 | 1/1998 |
| DE | 112008000357 T5 | 12/2009 |
| DE | 102015004689 A1 | 10/2015 |

(Continued)

OTHER PUBLICATIONS

Takeuchi et al., 6-Axis control ultraprecision microgrooving on sculptured surfaces with non-rotational cutting tool, CIPR Annals, Manufacturing Technology 58 (2009) pp. 53-56.*

(Continued)

*Primary Examiner* — Carlos R Ortiz Rodriguez
(74) *Attorney, Agent, or Firm* — Hauptman Ham, LLP (57) ABSTRACT

A program generation device generates a program for controlling machining of a groove which is performed by machining a plurality of holes on a workpiece. The program generation device receives specified values including a tool radius, a groove shape (a length of the groove), and a cusp height and calculates positions of the plurality of holes based on the specified values which are received. Then, the program generation device calculates a machining order of the plurality of holes based on the specified values and respective values calculated by a hole machining set value calculation unit so that a bias is not generated in a removal stock for a tool in machining.

5 Claims, 9 Drawing Sheets

(1) HOLE MACHINING ORDER OF CASE WHERE HOLES ALLOTTED TO HIGHER PRIORITY GROUP ARE MACHINED EARLIER (2) HOLE MACHINING ORDER OF CASE WHERE HOLES ARE MACHINED IN SEQUENCE FROM END WHILE GIVING PRIORITY TO HOLES ALLOTTED TO THE HIGHER PRIORITY GROUP (56) References Cited

FOREIGN PATENT DOCUMENTS

| EP | 2189860 B1 | 12/2013 |
|---|---|---|
| JP | 5-92347 A | 4/1993 |
| JP | 10-268919 A | 10/1998 |
| JP | 2001-255918 A | 9/2001 |
| JP | 2002-361513 A | 12/2002 |
| JP | 2008-126377 A | 6/2008 |
| JP | 2011-161566 A | 8/2011 |
| JP | 2013-161111 A | 8/2013 |

OTHER PUBLICATIONS

Office Action in JP Application No. 2016-026672, dated Feb. 27, 2018, 4 pp.
Dffice Action in DE Application No. 102017102524.3, dated Feb. 27, 2019, 15pp.

* cited by examiner

(1) HOLE MACHINING ORDER OF CASE WHERE HOLES ALLOTTED TO HIGHER PRIORITY GROUP ARE MACHINED EARLIER (2) HOLE MACHINING ORDER OF CASE WHERE HOLES ARE MACHINED IN SEQUENCE FROM END WHILE GIVING PRIORITY TO HOLES ALLOTTED TO THE HIGHER PRIORITY GROUP

FIG.4

| SCREEN FOR GROOVE MACHINING BY DRILLING | | | |
|---|---|---|---|
| TOOL RADIUS | (1) | FEED RATE 1 | (9) |
| CUSP HEIGHT | (2) | FEED RATE 2 | (10) |
| GROOVE SHAPE | | FEED RATE 3 | (11) |
| START POINT | (3) | INTER-HOLE DISTANCE | (12) |
| END POINT | (4) | NUMBER OF HOLES | (13) |
| LINEAR CIRCULAR ARC | (5) | OVERLAPPING PERCENTAGE | (14) |
| CIRCULAR ARC RADIUS | (6) | | |
| GROOVE DEPTH | (7) | MACHINING ORDER ADJUSTMENT | (15) |
| RETRACTED POSITION | (8) | MACHINING TIME | (16) |

(1) INPUT TOOL RADIUS/TOOL DIAMETER [mm]
(2) INPUT CUSP HEIGHT [mm]
(3) INPUT START POINT POSITION (COORDINATE VALUE)
(4) INPUT END POINT POSITION (COORDINATE VALUE)
(5) SELECT AND INPUT LINEAR / CIRCULAR ARC CW / CIRCULAR ARC CCW
(6) INPUT CIRCULAR ARC RADIUS [mm] IN CASE OF CIRCULAR ARC
(7) INPUT GROOVE DEPTH [mm]
(8) INPUT RETRACTED POSITION (R POINT) (COORDINATE VALUE)

(9) INPUT FEED RATE 1 [mm/min]
(10) INPUT FEED RATE 2 [mm/min]
(11) INPUT FEED RATE 3 [mm/min]
(12) DISPLAY INTER-HOLE DISTANCE [mm]
(13) DISPLAY NUMBER OF HOLES [PIECES]
(14) DISPLAY OVERLAPPING PERCENTAGE [%]
(15) CHANGE HOLE MACHINING ORDER BY CHECK BOX
(16) DISPLAY PREDICTED MACHINING TIME

G_ : CYCLE COMMAND FOR CONTINUOUS DRILLING
X_, Y_ : HOLE POSITION COORDINATE
Z_ : DISTANCE FROM RETRACTED POSITION TO HOLE BOTTOM
R_ : RETRACTED POSITION
F_ : FEED RATE

RAMPING

FIG.9B
EXTENSION FROM HOLE FORMING (HELICAL MACHINING/DRILLING)
TO GROOVE SHAPE (LATERAL SURFACE MILLING)

FIG.9C CONTINUOUS DRILLING (ROUGH MACHINING)

FIG.11

PROGRAM GENERATION DEVICE GENERATING PROGRAM FOR GROOVE MACHINING BY DRILLING

RELATED APPLICATIONS

The present application claims priority to Japanese Patent Application Number 2016-026672, filed Feb. 16, 2016, the disclosure of which is hereby incorporated by reference herein in its entirety.

BACKGROUND OF THE INVENTION

1. Field of the Invention

The present invention relates to a program generation device which generates a program for groove machining by drilling.

2. Description of the Related Art

Figure 9A:
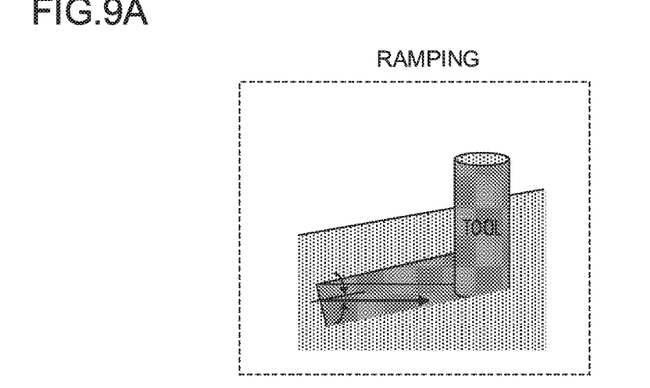
FIGS. 9A to 9C respectively illustrate examples of a groove machining method according to a prior art technique.
Figure 9B:
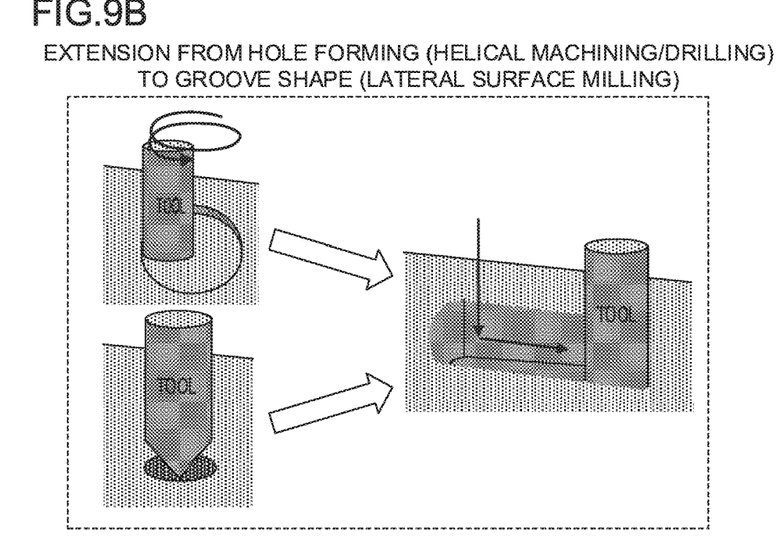
Figure 9C:
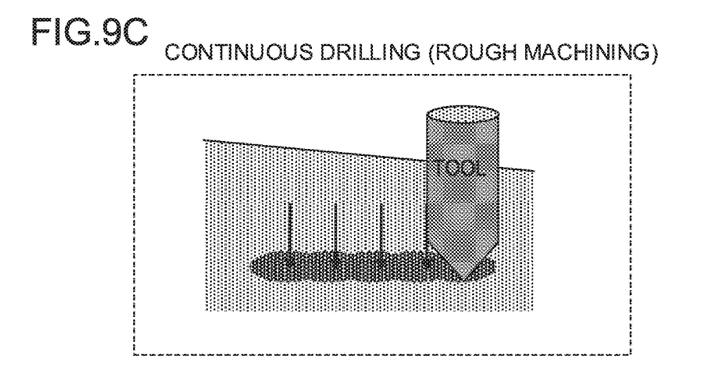

Machining of a groove shape is generally performed by machining methods as those illustrated in FIGS. 9A to 9C. "Ramping" illustrated in FIG. 9A is a machining method for forming a groove by cutting a workpiece by a tool which is rotating and is tilted with respect to the workpiece. Further, "extension from hole forming to a groove shape" illustrated in FIG. 9B is a machining method in which after holes are formed on a workpiece by helical machining or drilling, a groove is formed from the holes by lateral surface milling or the like. Meanwhile, "continuous drilling" illustrated in FIG. 9C is a machining method in which a boring such as drilling is repeatedly performed along a groove shape and this "continuous drilling" is mainly used for groove machining (rough machining) of a material which is hard to cut. In the case of a material hard to cut, machining in a direction orthogonal to a tool (spindle) axis direction is mechanically hard to be performed and machining chatter easily occurs, so that machining cannot be performed at a high feed rate, thereby requiring a great deal of machining time. Therefore, in the case where a groove is formed on a material hard to cut, the "groove machining by continuous drilling" which is mechanically strong and in which a boring such as drilling in a tool direction, in which a feed rate can be raised, is repeatedly performed along a groove shape is sometimes employed.

As a prior art technique related to the continuous drilling, Japanese Patent Application Laid-Open No. 10-268919, for example, discloses a technique by which a product-shape profile line is divided so as to obtain constant hole pitch even between a straight line part and a curved line part and thus keep a load constant. Further, Japanese Patent Application Laid-Open No. 2013-161111 discloses a technique by which a thrust sectional area is calculated based on a CAD shape and a tool radius and thus an area cut by one thrust machining is made constant so as to achieve reduction in the number of times of the thrust machining and prolonging of a service life of a tool.

Japanese Patent Application Laid-Open No. 05-92347 discloses a technique by which a cutting area for one thrust machining, which is performed along a profile-line shape, is made constant so as to make a cutting amount constant and enable thrust machining to be performed under the same condition every time, realizing speed-up of the machining and prolonging of a service life of a tool. Further, Japanese Patent Application Laid-Open No. 2008-126377 discloses a technique by which an auxiliary line is generated at a profile-line shape inflection point (high cutting load) and machining points are arranged at predetermined intervals along the auxiliary line so as to prevent a cutting load from increasing, in thrust machining along a profile-line shape. Further, Japanese Patent Application Laid-Open No. 2002-361513 discloses a technique in which thrust machining is performed so as to take a removal stock as large as possible along the ZX shape (a shape in the depth direction) in the thrust machining.

Figure 10:
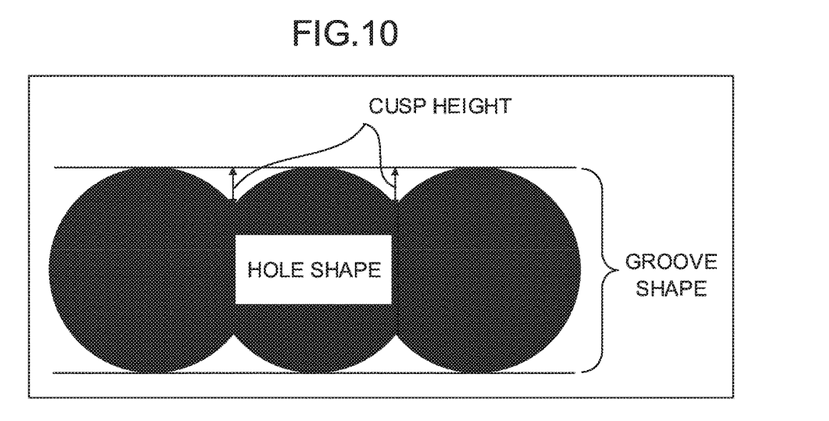
FIG. 10 illustrates a cusp height in groove machining by continuous drilling.

In the case where groove machining by drilling is performed, un-machined parts (cusps) by a tool occur as illustrated in FIG. 10. If the height of these un-machined parts (hereinafter referred to as cusp height) is large, machining time and a load on a tool in a finishing are increased. Therefore, when an operator generates a machining program for groove machining by drilling, the operator needs to calculate this cusp height by herself/himself so as to generate a program by which the cusp height is reduced as much as possible. On the other hand, the cusp height can be reduced as the number of times of drilling is increased, but the machining time is increased along with the increase of the number of times of drilling. Therefore, an operator is required to balance this machining time (the number of times of drilling) and the cusp height. This calculation and balancing have been an operation which takes much time and labor of an operator.

Figure 11:
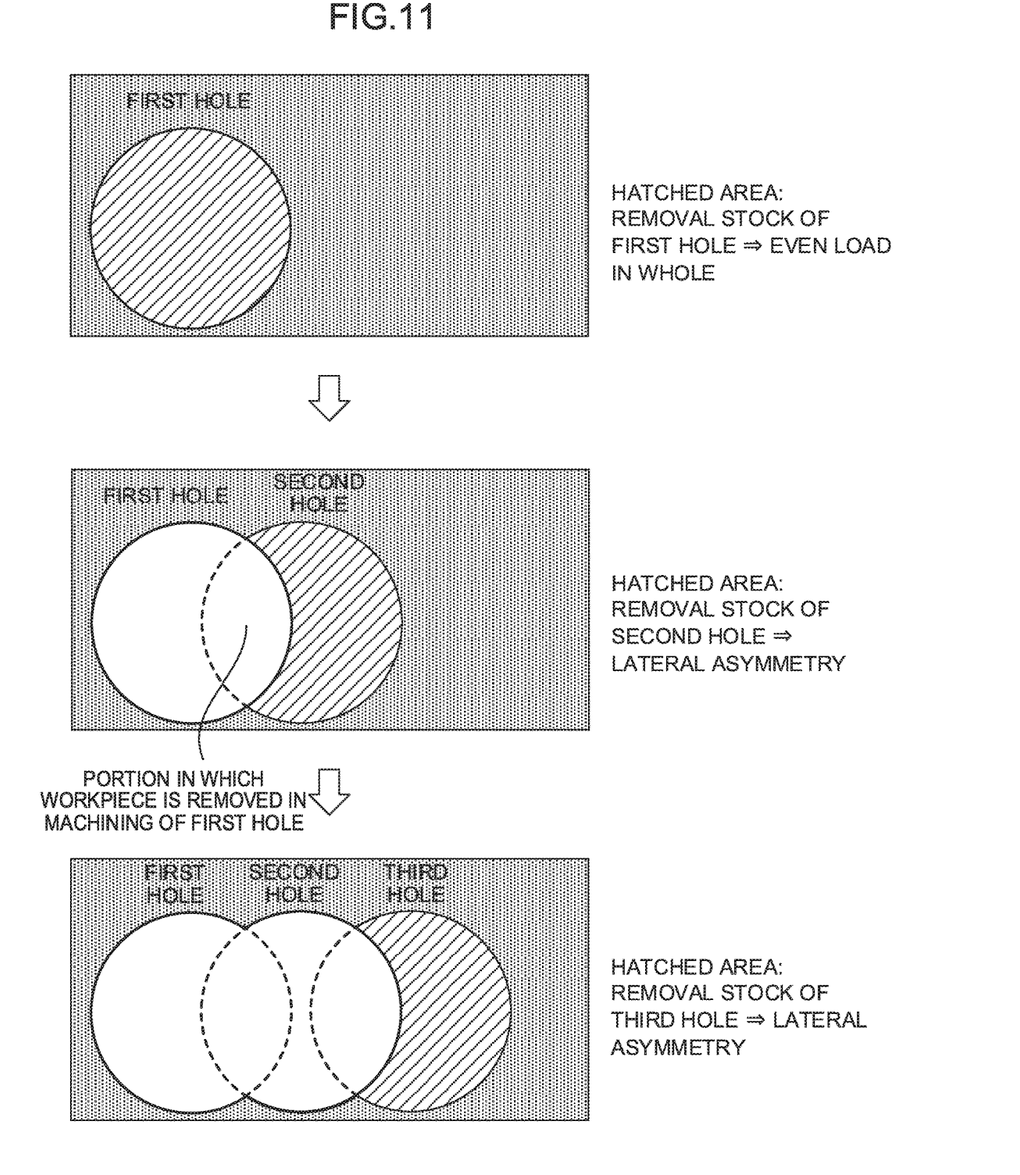
FIG. 11 illustrates biases in removal stocks in groove machining by continuous drilling.

Further, if the groove machining by continuous drilling is simply performed from one direction in sequence, a part of a portion, to which a tool cuts in, of a workpiece has already been removed in the previous machining to generate a bias (lateral asymmetry) in a removal stock in machining of the second and following holes, as illustrated in FIG. 11. Therefore, as a drilling tool tends to violently move in machining of the second and following holes, the machining easily becomes unstable, causing remarkable reduction in a service life of the tool. To deal with such situation, it is necessary to lower a feed rate from the second hole so as to achieve stable machining. However, this lowering causes increase of machining time in the whole machining for the second and following holes disadvantageously.

Any of the prior art techniques disclosed in the above-mentioned patent documents does not provide a technical solving method with respect to these problems.

SUMMARY OF THE INVENTION

An object of the present invention is to provide a program generation device which achieves groove machining by continuous drilling in a manner to stabilize a drilling tool while taking into account a balance between the cusp height and machining time.

The program generation device according to the present invention, for solving the above-mentioned problems, offers a function by which specifications such as a cusp height specified by an operator are received via an interactive user interface and drilling positions and machining time are automatically calculated based on the specified values so as to output the automatically calculated hole positions as hole positions of a drilling cycle. Further, the program generation device according to the present invention obtains a hole machining order in which biases in removal stocks are taken into account in the automatic calculation of drilling positions.

A program generation device according to the present invention is configured to generate a program for controlling machining of a groove which is performed by machining a plurality of holes on a workpiece, and includes a specified value input unit which receives specified values including at least a tool radius, a groove shape including a length of the groove, and a cusp height, a hole machining set value calculation unit which calculates at least positions of the plurality of holes based on the specified values, and a hole machining order calculation unit which calculates a machining order of the plurality of holes based on the specified values and respective values calculated by the hole machining set value calculation unit so that a bias is not generated in a removal stock for a tool in machining.

The program generation device may further include a feed rate setting unit which sets a feed rate used in machining of each of the plurality of holes.

The program generation device may further include a program output unit which generates a program for machining the groove by drilling, based on the specified values, respective values calculated by the hole machining set value calculation unit, the machining order of the plurality of holes that is calculated by the hole machining order calculation unit, and the feed rate which is used in machining of each of the plurality of holes and is set by the feed rate setting unit, and outputs the program which is generated.

The program generation device may further include a machining time calculation unit which calculates machining time taken for machining the groove, based on respective values calculated by the hole machining set value calculation unit, the machining order of the plurality of holes that is calculated by the hole machining order calculation unit, and the feed rate which is used in machining of each of the plurality of holes and is set by the feed rate setting unit.

The program generation device may further include a result display unit which displays at least any of respective values calculated by the hole machining set value calculation unit, the machining order of the plurality of holes that is calculated by the hole machining order calculation unit, the feed rate which is used in machining of each of the plurality of holes and is set by the feed rate setting unit, and the machining time which is calculated by the machining time calculation unit.

According to the present invention, a program for groove machining by drilling, in which a cusp height and machining time are taken into account, can be easily generated and further, a machining order in which biases in removal stocks are taken into account is set so as to be able to reduce vibration and an abnormal load occurring on a tool and achieve stable machining (prolonging of a service life of a tool).

DETAILED DESCRIPTION OF THE PREFERRED EMBODIMENT

An embodiment of the present invention will be described below with reference to the accompanying drawings. A basic principle of the present invention will be first described.

A program generation device according to the present invention receives specifications of a cusp height and the like specified by an operator so as to calculate drilling positions and machining time based on the specified values and obtain a hole machining order in which bias in removal stocks are taken into account. Examples of values specified by an operator include a tool radius, a cusp height, a groove shape, and a feed rate. The program generation device according to the present invention obtains the number of holes, an inter-hole distance (hole positions), a percentage of an area in which holes adjacent to each other are overlapped with each other, and a hole machining order based on these specified values in groove machining by continuous drilling.

The program generation device according to the present invention can be implemented as a numerical controller controlling a machine, a simulation device, a personal computer, and the like. In the case where the program generation device according to the present invention is implemented as a numerical controller, the program generation device is capable of controlling a machine by a program which is generated based on various values of groove machining by continuous drilling which are obtained based on values specified by an operator. Further, in the case where the program generation device according to the present invention is implemented as a simulation device or a personal computer, the program generation device can be configured so that the program generation device is capable of performing simulation based on a generated program or outputting a generated program to one or a plurality of numerical controllers via a network or the like.

Procedures for calculating an inter-hole distance (or hole to hole distance), the number of holes (hole positions), and an overlapping percentage between two holes adjacent to each other will be described below in accordance with FIG. 1.

<Procedure for Calculating Inter-Hole Distance Based on Tool Radius and Cusp Height>

When a tool radius is designated as R [mm], a distance from a start point to an end point of a straight groove shape is designated as L [mm], and a cusp height is designated as H [mm], the cusp height H [mm] can be expressed as Formula (1) below. Therefore, the inter-hole distance D [mm] can be calculated based on R (the tool radius) and H (the cusp height) by using Formula (2) below which is obtained by deforming Formula (1).

$$H = R - \sqrt{R^2 - \frac{D^2}{4}} \quad (1)$$

$$D = 2\sqrt{2RH - H^2} \quad (2)$$

<Procedure for Calculating Number of Holes (Hole Positions) Based on Inter-Hole Distance and Groove Shape>

The number of holes N can be calculated based on the distance L [mm] from a start point to an end point of a groove, the tool radius R [mm], and the inter-hole distance D [mm] by using Formula (3) below. Then, positions of respective holes may be set by repeating a procedure (N−1) times in which a position shifted from a start point position of a groove toward an end point thereof by the tool radius R is set as a center point (machining position) of a hole on a start point side and the inter-hole distance D is added from the center position toward the end point so as to obtain a center point (machining position) of each hole. Here, in the case where the number of holes N calculated based on values specified by an operator is not an integer, N which is an integer may be calculated by using Formula (4) below, for example.

$$N = \frac{L - 2R}{D} + 1 \quad (3)$$

$$N = -\left[-\frac{L - 2R}{D}\right] + 1 \quad (4)$$

(here, [ ] is a symbol denoting gauss)

When hole positions are determined from the start point position toward the end point by executing the above-described procedure based on the tool radius R [mm], the distance L [mm] from a start point to an end point of a groove shape, and the cusp height H [mm], which are specified by an operator, an end portion of the last hole sometimes does not accord with a position which has the distance L from the start point (that is, the end point of the groove shape) (the above-mentioned case where the number of holes N calculated by Formula (3) is not an integer and Formula (4) is required to be used). In such case, a position of the last one hole may be defined so that an end portion of the hole accords with a position of an end point while ignoring difference from the specified cusp height H. As another method, the inter-hole distance D may be replaced with a value calculated by Formula (5) below so as to set the cusp height H on a value slightly smaller than a specified value without increasing N. The cusp height H is not set larger than the value specified by an operator in either method, giving no influence.

$$\hat{D} = \frac{L - 2R}{-\left[-\frac{L - 2R}{D}\right]} \quad (5)$$

(here, [ ] is a symbol denoting gauss)

<Procedure for Calculating Overlapping Percentage Between Two Holes Adjacent to Each Other Based on Inter-Hole Distance and Number of Holes (Hole Positions)>

Figure 1:
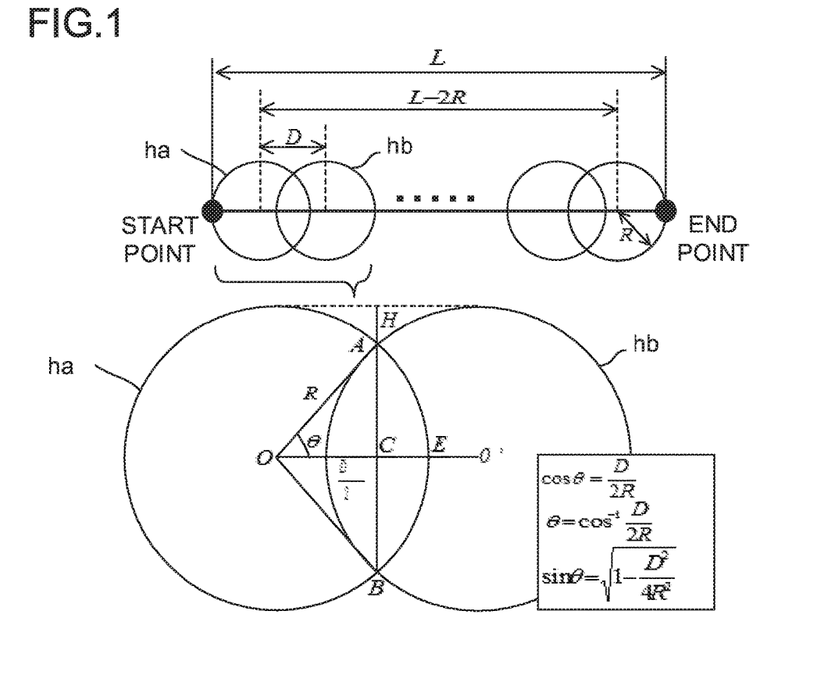
FIG. 1 illustrates procedures of calculations for an inter-hole distance, the number of holes (hole positions), an overlapping percentage of two holes adjacent to each other in the case where a linear groove shape is machined.

As illustrated in FIG. 1, an overlapping area S [mm²] between two holes adjacent to each other is obtained by quadrupling an area obtained by subtracting a triangle AOC from a sector AOE. Since an area of the sector AOE, an area of the triangle AOC, and the overlapping area S between two holes adjacent to each other ha and hb can be expressed by Formula (6) below, an overlapping percentage P[%] between these two holes ha and hb adjacent to each other can be calculated by Formula (7) below.

$$\text{Sector } AOE = \frac{1}{2}R^2\theta \quad (6)$$

$$\Delta AOC = \frac{DR^2}{4}\sin\theta$$

$$S = 4(\text{sector } AOE + \Delta AOC) = 2R^2\cos^{-1}\frac{D}{2R} - DR\sqrt{1 - \frac{D^2}{4R^2}}$$

$$P = \frac{S}{\pi R^2} \times 100 \quad (7)$$

A procedure for determining a hole machining order in a manner to take into account a bias in a removal stock and a procedure for setting a feed rate in machining of each hole will now be described in accordance with FIG. 2.

<Procedure for Determining Hole Machining Order while Taking into Account Bias of Removal Stock>

When a hole machining order is determined, a priority order in hole machining is first determined for respective holes. In the determination of a priority order, holes whose hole positions are determined by the above-described procedure are allotted to priority groups (priority group 1, priority group 2, priority group 3, . . . ) of hole machining to which a priority order in the hole machining is defined. Then, a machining order in which holes allotted to the group of higher priority are given priority is determined.

The procedure for allotting holes to priority groups will be described with reference to FIG. 2.

Figure 2:
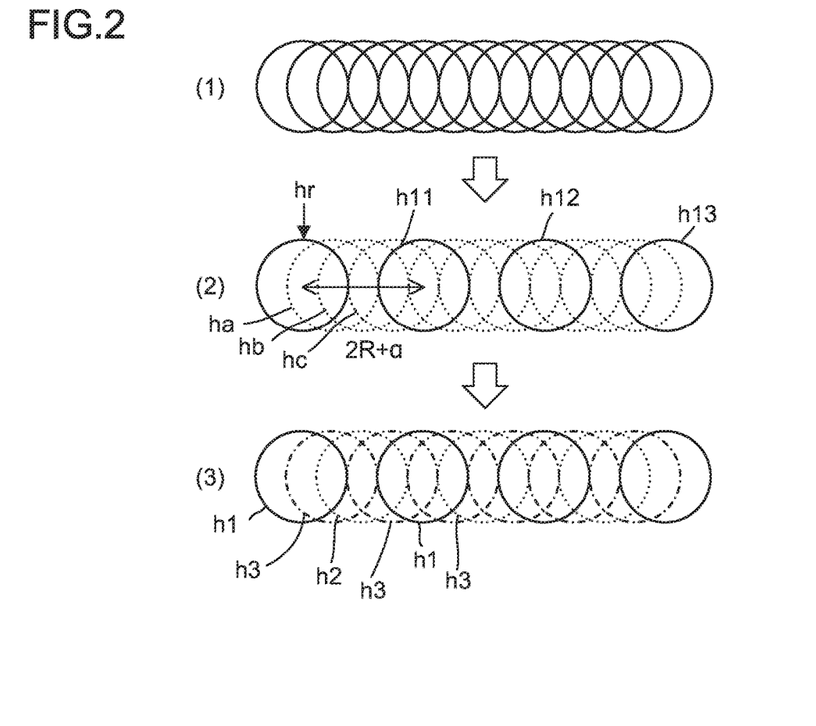
FIG. 2 illustrates a method for determining a priority order of hole machining.

In the case where drilling positions are determined on hole positions of solid-line circles (hole intervals are constant) illustrated in (1) of FIG. 2 based on specifications of a tool radius, a cusp height, and a groove shape which are specified by an operator, a hole closest to a start point of the specified groove shape is set as a reference hole hr as illustrated in (2) of FIG. 2 so as to be allotted to the priority group 1. Then, a hole h11 which has a center distance of 2R+margin value α or larger with respect to the center of the reference hole hr and has the closest distance to the reference hole hr while sandwiching $2^{n-1}$ holes (n is a natural number) between the hole h11 and the reference hole hr is allotted to this priority group 1. Further, a hole h12 which has a center distance of 2R+margin value α or larger with respect to the center of the hole h11, which is allotted to the priority group 1, and has the closest distance to the reference hole hr while sandwiching $2^{n-1}$ holes between the hole h12 and the reference hole hr is allotted to this priority group 1 in a similar manner. By repeating this, holes of solid-line circles illustrated in (3) of FIG. 2 are allotted to the priority group 1. In the example of (2) of FIG. 2, a hole following $2^{2}-1=3$ holes, ha, hb, and hc, is sequentially selected by starting from the reference hole hr and the selected holes and the reference hole hr are allotted to the priority group 1. Here, it is assumed that the margin value α can be specified by a parameter within a range of 0≤α≤R.

Subsequently, a hole (holes h2 illustrated by dotted-line circles in (3) of FIG. 2) whose center point is closest to a middle point between center points of two holes adjacent to each other among the holes allotted to the priority group 1 (holes h1 illustrated by solid-line circles in (3) of FIG. 2) is allotted to the priority group 2. Further, a hole (holes h3 illustrated by dashed-line circles in (3) of FIG. 2) whose center point is closest to a middle point between a center point of a hole h1 allotted to the priority group 1 and a center point of a hole h2 which is adjacent to the hole h1 and allotted to the priority group 2 is allotted to the priority group 3. By repeating this, every hole is allotted to the priority group.

Figure 3:
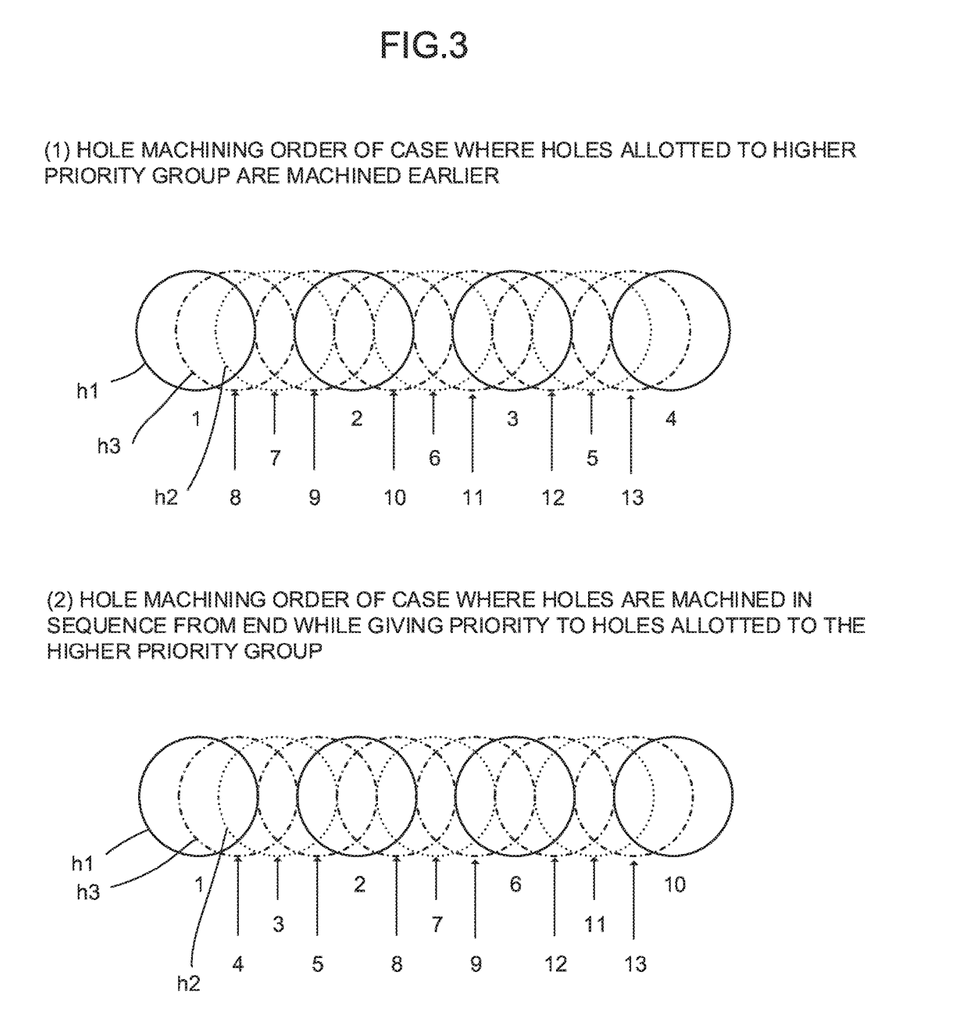
FIG. 3 illustrates a method for determining an order of hole machining in accordance with the priority order of hole machining.

Last, an order of hole machining of the holes is determined in a manner to give priority to holes which are allotted to the higher priority group. The order of hole machining of the holes may be determined so that any hole may be machined earlier among holes which are allotted to the same priority group and may be determined so that a hole which is allotted to the higher priority group is machined in a manner to be given priority among holes whose machining ranges are overlapped with each other. For example, in the case where the holes are allotted to the priority groups as illustrated in (3) of FIG. 2, the holes may be machined in the order illustrated in (1) of FIG. 3 when holes allotted to the higher priority group are machined earlier (than holes allotted to the lower priority group), and the holes may be machined in the order illustrated in (2) of FIG. 3 when the holes are machined in sequence from one end to the other end of a groove while giving priority to holes allotted to the higher priority group.

Here, when the holes are allotted to the priority groups by the above-described procedure, some holes among holes positioned close to an end point are not sometimes allotted to the priority groups. Such holes may be ordered to be machined in sequence from the end point side as holes on the lowest priority after completion of machining of other holes, for example.

<Procedure for Setting Feed Rate in Hole Machining>

By performing hole machining from holes allotted to the higher priority group in accordance with a priority order determined through the above-mentioned procedure, even holes whose machining ranges are overlapped with each other can be machined without biases in removal stocks. However, a removal stock in hole machining varies depending on the priority group to which a hole is allocated, so that a feed rate of a tool in machining may be enabled to be set with respect to each priority group.

The feed rate may be enabled to be specified in several patterns and feed rates may be separately specified for the case where the whole removal stock is left and the case where a part of the removal stock is lacked, for example. In the case where the holes are allotted to the priority groups as illustrated in (3) of FIG. 2, for example, such setting may be employed that a feed rate under a recommended condition (feed rate 1) is used when holes allotted to the priority group 1 are machined and a feed rate lower than the recommended condition (feed rate 2) is used when holes allotted to other priority groups are machined.

Here, as for some holes which are positioned close to an end point of a groove and are not allotted to any one of priority groups in the procedure for determining an order of hole machining, hole machining has to be performed in a state that removal stocks are not uniform. Therefore, a further lower feed rate (feed rate 3) by which stable machining can be performed even in such state may be set. The number of such holes is very small among the whole number of holes to be machined, only giving very small influence on the whole machining time.

Further, machining time may be calculated based on respective values determined by the above-described each procedure to be offered to an operator.

<Procedure for Calculating Machining Time>

Time taken for machining one hole can be calculated by dividing a distance to a hole bottom of the hole by a specified feed rate in machining of the hole. Further, time from completion of machining of a previous hole to start of machining of the next hole can be calculated by dividing a moving distance of a tool from a completion position of the machining of the previous hole to a start position of the machining of the next hole by a rapid traverse rate of the tool. Machining time of groove machining by continuous drilling can be calculated by calculating these values based on values, which are obtained through the above-mentioned procedures, and adding up these values. The calculated machining time may be offered to an operator by being displayed on a screen of the program generation device, for example, or may be recorded in a form of a log, for example.

<Procedure for Receiving Specification of Respective Values Specified by Operator and for Displaying Result>

Figure 4:
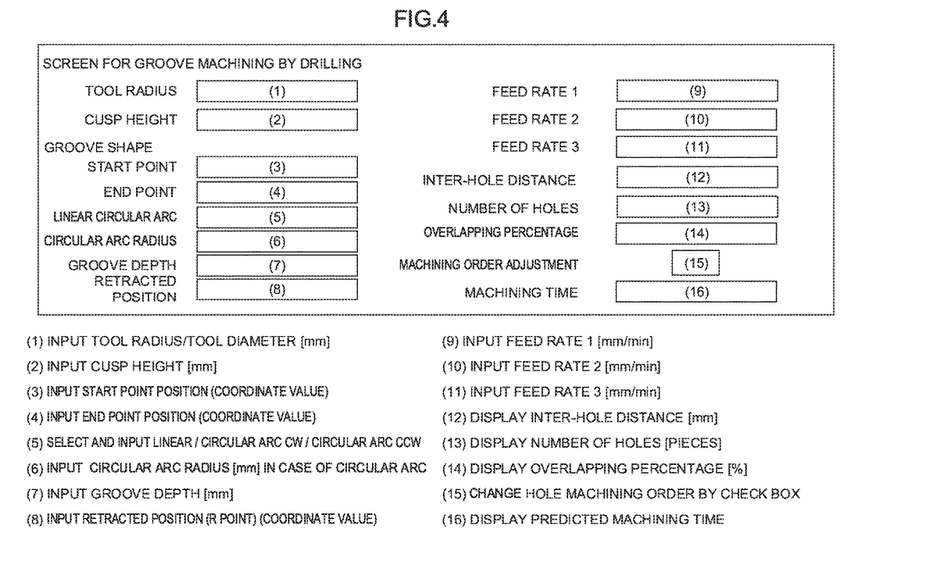
FIG. 4 illustrates an example of a user interface of the program generation device according to the present invention.

FIG. 4 illustrates an example of a user interface screen on which specifications of various values such as a tool radius, a cusp height, and a groove shape from an operator are received and results of the above-described various procedures are displayed in the program generation device according to the present invention.

Reception of specifications of various values from an operator and display of results of the above-described various procedures are performed on the same screen in the example of FIG. 4, but the reception and the display may be performed on separate screens. Further, in addition to display of an inter-hole distance, the number of holes, an overlapping percentage between two holes adjacent to each other, and machining time, the inter-hole distance, the overlapping percentage between two holes adjacent to each other, and a hole machining order, for example, may be displayed to be intuitively easily understood with graphic display as that illustrated in FIG. 3.

An operator can change each feed rate, for example, while checking the inter-hole distance, the number of holes, and the overlapping percentage between two holes adjacent to each other on the screen illustrated in FIG. 4. Further, the operator can check machining time and adjust a value of the cusp height if machining time is too long. Furthermore, the operator can check or uncheck machining order adjustment and select whether to adjust the hole machining order by the above-described procedure or to simply perform machining from one end of a groove to the other end in sequence.

<Procedure for Outputting Continuous Drilling Cycle Program>

Figure 5:
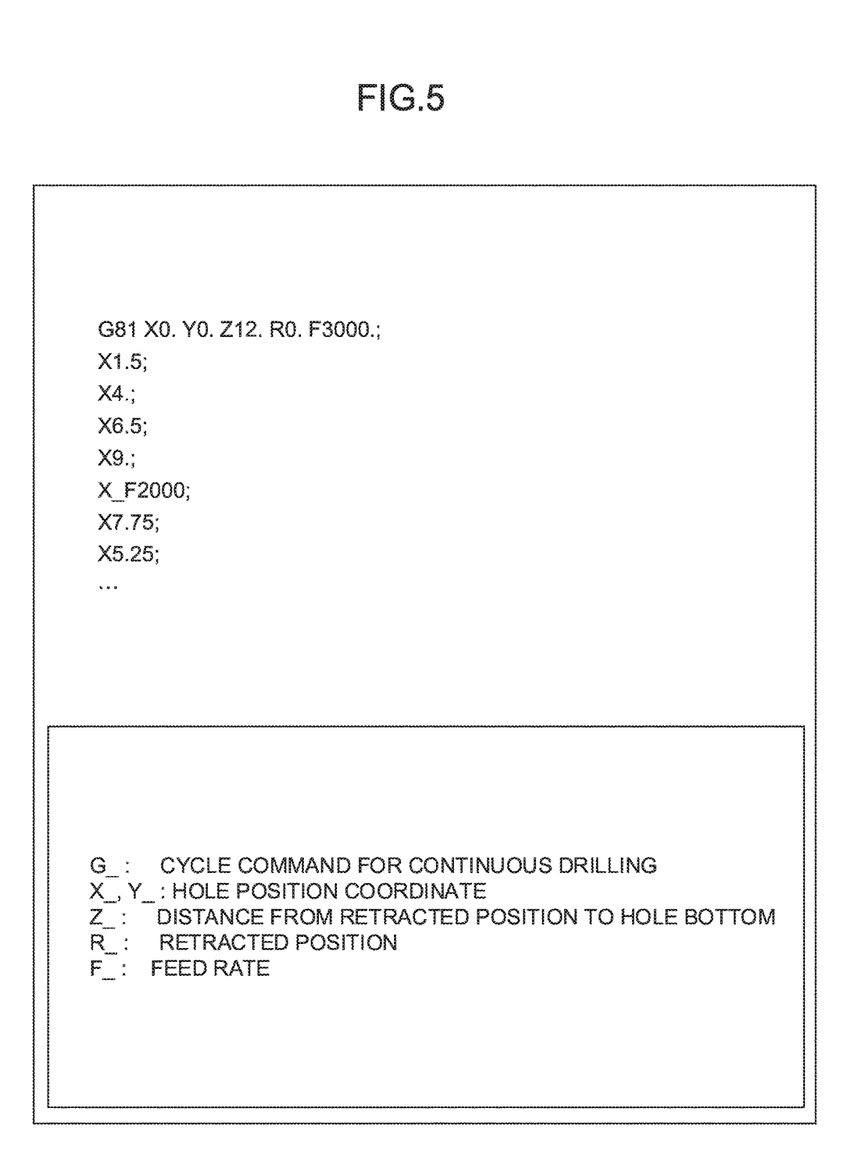
FIG. 5 illustrates an example of a program outputted from the program generation device according to the present invention.

FIG. 5 illustrates an output example of a continuous drilling cycle program which is automatically outputted by the program generation device according to the present invention.

A program which is generated and outputted by the program generation device according to the present invention is automatically generated, based on respective values specified by an operator and an inter-hole distance, a position of each hole, a machining order of holes, and the like which are determined by the above-described respective procedures, so as to be outputted. In the example illustrated in FIG. 5, a continuous drilling cycle is specified by a command G81 and commands of various values such as a hole position coordinate, a distance from a retracted position to a hole bottom, a retracted position, and a feed rate are issued below so as to perform drilling on a coordinate position specified by the hole position coordinate in each block. Here, the program illustrated in FIG. 5 is an example of a drilling program, but a program for a continuous helical machining may be outputted.

Figure 6:
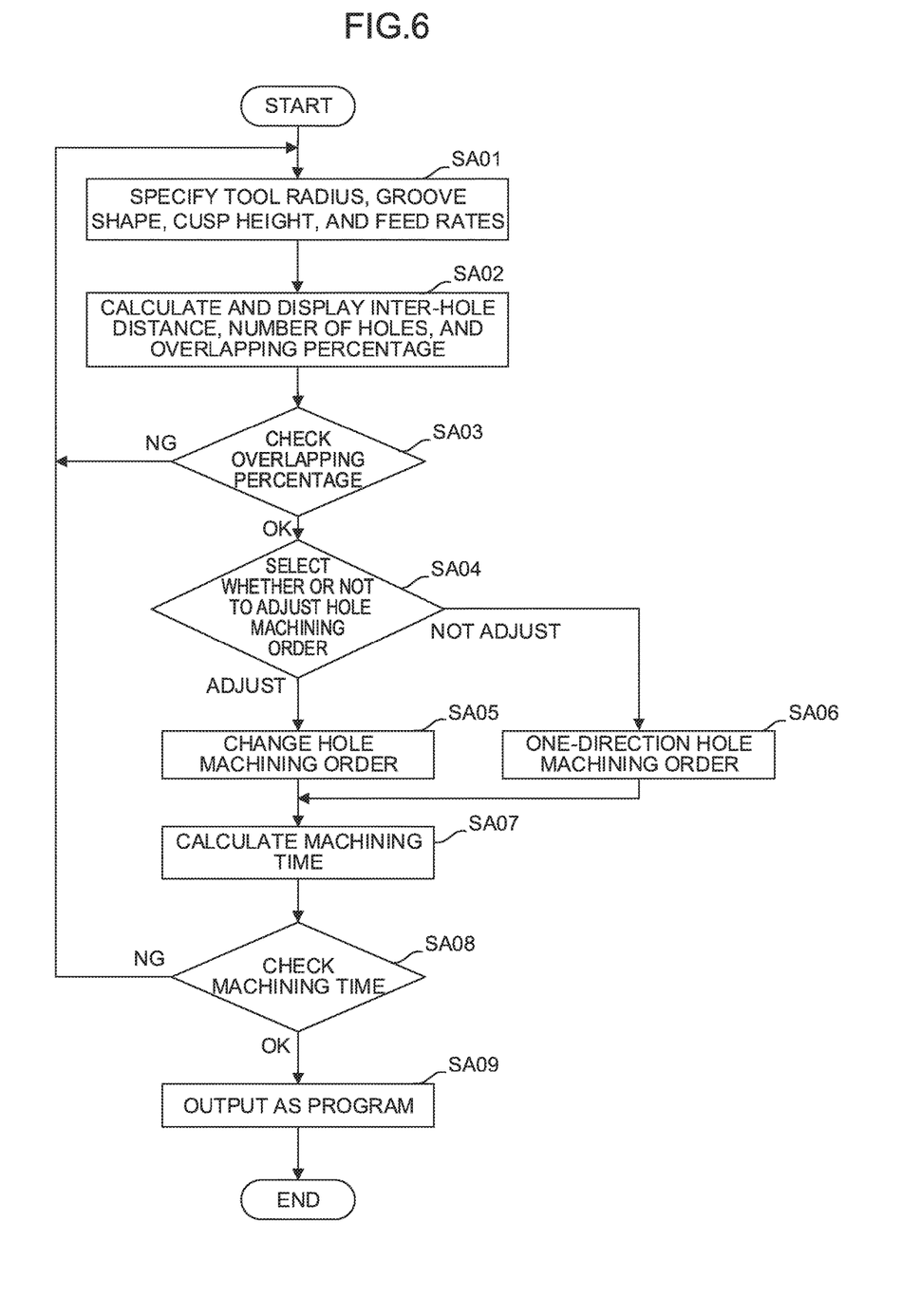
FIG. 6 is a schematic flowchart illustrating a procedure to outputting of a program by the program generation device according to the present invention.

A flow of the above-described procedures will be described by using a flowchart of FIG. 6.

[Step SA01] The program generation device receives specifications of various values such as the tool radius R, a groove shape, the cusp height H, and feed rates F1, F2, and F3 from an operator.

[Step SA02] The program generation device calculates the inter-hole distance D, the number of holes N, the overlapping percentage P between two holes adjacent to each other, and the like in accordance with the above-described respective procedures so as to display calculation results on a screen.

[Step SA03] An operator checks the calculation results displayed on the screen of the program generation device. As a result, if there is no problem, the process proceeds to step SA04, whereas if there is a problem, the process returns to step SA01 and the operator specifies various values again.

[Step SA04] The operator operates the program generation device so as to select whether or not to adjust a hole machining order. In the case where the hole machining order is adjusted, the process proceeds to step SA05. While, in the case where the hole machining order is not adjusted, the process proceeds to SA06.

[Step SA05] The program generation device determines a machining order of holes and sets a feed rate used in machining each hole in accordance with the above-described procedures.

[Step SA06] The program generation device determines the machining order of holes so that the holes are machined in sequence from a specified start point side in the groove shape. As for the feed rates used for machining of the holes, the feed rate for a hole on the start point position is set to the feed rate 1 and the feed rates for other holes are set to the feed rate 3.

[Step SA07] The program generation device calculates machining time of the whole machining process based on the values, the machining order of holes, and the setting of the feed rates which are determined in the above-mentioned steps so as to display the calculated machining time on the screen.

[Step SA08] The operator checks the calculation result displayed on the screen of the program generation device. As a result, if there is no problem, the process proceeds to step SA09, whereas if there is a problem, the process returns to step SA01 and the operator specifies various values again.

[Step SA09] The program generation device generates a machining program based on the values, the machining order of holes, and the setting of the feed rates which are determined in the above-mentioned steps so as to output the machining program to a non-volatile memory or the like.

Figure 7:
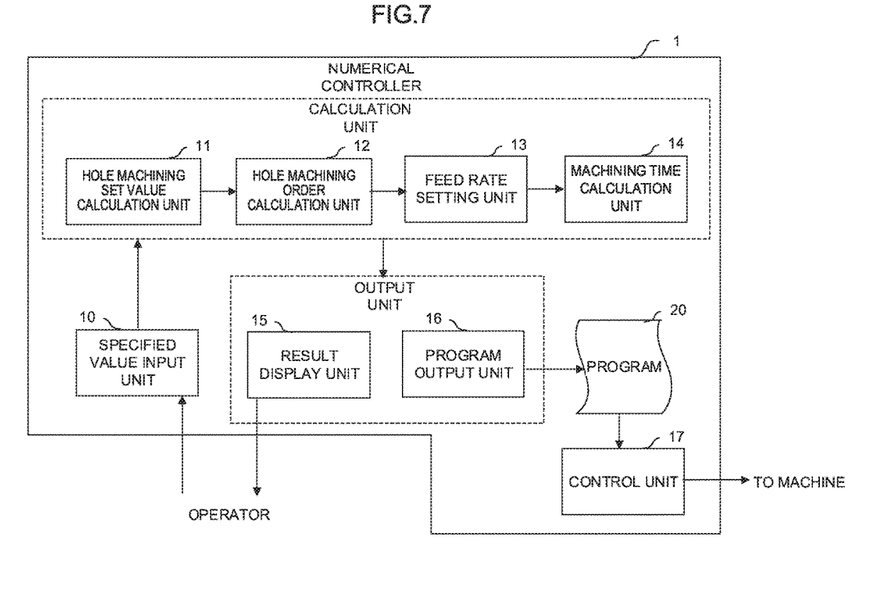
FIG. 7 is a functional block diagram of a numerical controller (program generation device) according to an embodiment of the present invention.

FIG. 7 is a functional block diagram in the case where the program generation device according to the present invention is implemented as a numerical controller.

A numerical controller 1 according to the present embodiment includes a specified value input unit 10, a hole machining set value calculation unit 11, a hole machining order calculation unit 12, a feed rate setting unit 13, a machining time calculation unit 14, a result display unit 15, a program output unit 16, and a control unit 17.

The specified value input unit 10 receives, from an operator, specifications of various values such as a tool radius, a groove shape, a cusp height, and a feed rate based on inputs via an input device, which is not shown, and passes the received values to various functional means which will be described later.

The hole machining set value calculation unit 11 calculates values used for hole machining such as an inter-hole distance, the number of holes, and hole positions, and a value of an overlapping percentage between two holes adjacent to each other, for example, in accordance with the above-described procedures based on the values such as the tool radius, the groove shape, and the cusp height which are passed from the specified value input unit 10.

The hole machining order calculation unit 12 calculates a hole machining order, in which biases in removal stocks are taken into account, in accordance with the above-described procedure based on the values calculated by the hole machining set value calculation unit 11.

The feed rate setting unit 13 sets feed rates used in machining of the holes in accordance with the above-described procedure based on the machining order of the holes calculated by the hole machining order calculation unit 12.

The machining time calculation unit 14 calculates machining time taken for the whole machining, based on the values specified by the specified value input unit 10, the values calculated by the hole machining set value calculation unit 11, the hole machining order calculated by the hole machining order calculation unit 12, and the feed rates which are used in machining of the holes and set by the feed rate setting unit 13.

The result display unit 15 displays the values calculated by the hole machining set value calculation unit 11, the hole machining order calculation unit 12, the feed rate setting unit 13, and the machining time calculation unit 14 on a display device, which is not shown, so as to notify an operator of the values.

The program output unit 16 generates a program 20 for continuous drilling based on the values calculated by the hole machining set value calculation unit 11, the hole machining order calculation unit 12, the feed rate setting unit 13, and the machining time calculation unit 14 so as to store the generated program 20 in a non-volatile memory which is not shown.

The control unit 17 controls various units of a machine based on the program 20 outputted from the program output unit 16 so as to execute the continuous drilling.

The numerical controller 1 according to the present embodiment which has the above-described configuration is capable of easily generating a program for groove machining by drilling, in which the cusp height and machining time are taken into account, and sets a machining order while taking into account biases in removal stocks so as to be able to reduce vibration and an abnormal load occurring on a tool and achieve stable machining (prolonging of a service life of the tool).

The embodiment of the present invention has been described above. However, the present invention is not limited to the example of the above-described embodiment but may be embodied in various aspects by adding arbitrary alterations.

Figure 8:
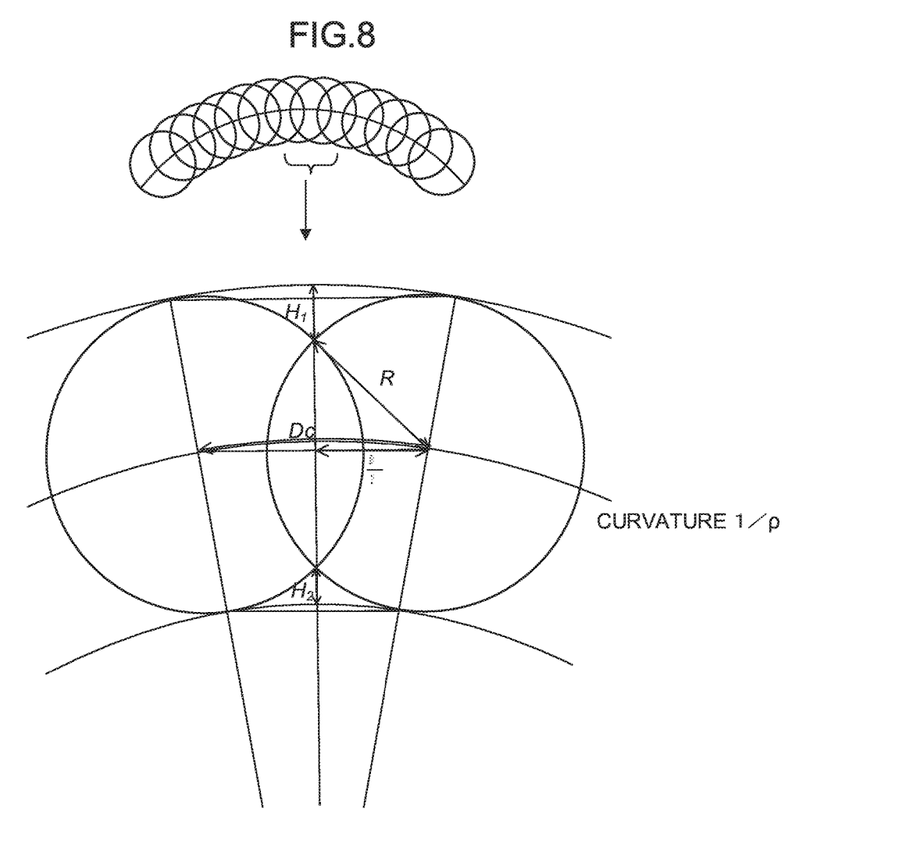
FIG. 8 illustrates procedures of calculations for an inter-hole distance, the number of holes (hole positions), an overlapping percentage of two holes adjacent to each other in the case where an circular arc groove shape is machined.

For example, the example in which the linear groove is machined is illustrated in the above-described embodiment. However, in the case where a groove having an circular arc shape as illustrated in FIG. 8 is machined, when a curvature of an circular arc drawn by a center line of the groove is set as lip, for example, cusp height H1 of a cusp which is made on an outside of the groove and cusp height H2 of a cusp which is made on an inside of the groove can be expressed by Formula (8) below and distance $D_c$ between center points of holes along the circular arc can be expressed by Formula (9) below. Then, similar procedures to the case of the linear groove shape are performed by using Formula (8) and Formula (9), and length $L_c$, which is calculated based on values specified by an operator, of the groove having the circular arc shape, in a manner to replace D, L, and H respectively with $D_c$, $L_c$, and $H_1$ (since $H_1 > H_2$ in general, only $H_1$ is considered) in Formula (1) to Formula (7) described above, being able to obtain the number of holes, hole positions, and the like of the case of the circular arc groove shape.

$$H_1 = \rho + R - \sqrt{R^2 - \frac{D^2}{4}} - \sqrt{\rho^2 - \frac{D^2}{4}} \tag{8}$$

$$H_2 = \sqrt{\rho^2 - \frac{D^2}{4}} - (\rho - R) - \sqrt{R^2 - \frac{D^2}{4}}$$

$$Dc = 2\rho \sin^{-1} \frac{D/2}{\rho} \tag{9}$$

Further, the functional block diagram of the case where the program generation device according to the present invention is implemented as a numerical controller is illustrated in the above description. However, the above-described configurations other than the control unit 17 may be implemented in a simulation device, a personal computer, or the like so as to be used as the program generation device which generates a program for groove machining by continuous drilling based on values specified by an operator.

The invention claimed is:

1. A program generation device, implemented as a numerical controller, which generates a program for controlling machining of a groove which is performed by machining a plurality of holes on a workpiece, the program generation device comprising:

a specified value input unit which receives specified values including at least a tool radius, a groove shape including a length of the groove, and a cusp height;

a hole machining set value calculation unit which calculates at least positions of the plurality of holes based on the specified values;

a hole machining order calculation unit which calculates a machining order of the plurality of holes based on the specified values and respective values calculated by the hole machining set value calculation unit so that a bias is not generated in a removal stock for a tool, with the tool radius, in machining, wherein the plurality of holes along the length of the groove are allocated to at least one higher priority group and at least one lower priority group, the holes allocated to the higher priority group are machined, in the machining order, by the tool earlier than the holes allocated to the lower priority group, and at least one of the holes allocated to the higher priority group is located, along the length of the groove, between two of the holes allocated to the lower priority group; and a control unit configured to cause the tool to move back and forth along the length of the groove while machining the plurality of holes in accordance with the machining order.

2. The program generation device according to claim 1, further comprising:

a feed rate setting unit which sets a feed rate used in machining of each of the plurality of holes.

3. The program generation device according to claim 2, further comprising:

a program output unit which generates a program for machining the groove by drilling, based on the specified values, respective values calculated by the hole machining set value calculation unit, the machining order of the plurality of holes that is calculated by the hole machining order calculation unit, and the feed rate which is used in machining of each of the plurality of holes and is set by the feed rate setting unit, and outputs the program which is generated.

4. The program generation device according to claim 2, further comprising:

a machining time calculation unit which calculates machining time taken for machining the groove, based on respective values calculated by the hole machining set value calculation unit, the machining order of the plurality of holes that is calculated by the hole machining order calculation unit, and the feed rate which is used in machining of each of the plurality of holes and is set by the feed rate setting unit.

5. The program generation device according to claim 4, further comprising:

a result display unit which displays at least any of respective values calculated by the hole machining set value calculation unit, the machining order of the plurality of holes that is calculated by the hole machining order calculation unit, the feed rate which is used in machining of each of the plurality of holes and is set by the feed rate setting unit, and the machining time which is calculated by the machining time calculation unit.

* * * * *